US009547221B2

(12) United States Patent
Okura

(10) Patent No.: US 9,547,221 B2
(45) Date of Patent: Jan. 17, 2017

(54) VIDEO PROJECTION DEVICE

(71) Applicant: Mitsubishi Electric Corporation, Tokyo (JP)

(72) Inventor: Kenichiro Okura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/023,097

(22) Filed: Sep. 10, 2013

(65) Prior Publication Data

US 2014/0132847 A1 May 15, 2014

(30) Foreign Application Priority Data

Nov. 13, 2012 (JP) ................... 2012-249085

(51) Int. Cl.
*G03B 21/10* (2006.01)
*G03B 21/14* (2006.01)
*G03B 21/28* (2006.01)

(52) U.S. Cl.
CPC ............. *G03B 21/10* (2013.01); *G03B 21/145* (2013.01); *G03B 21/28* (2013.01)

(58) Field of Classification Search
CPC ................................ G03B 21/62; G03B 21/10
USPC .............................................. 353/97; 359/450
See application file for complete search history.

(56) References Cited

U.S. PATENT DOCUMENTS

| 4,245,256 A | 1/1981 | Kokubo et al. |
| 5,491,585 A | 2/1996 | Dolgoff |
| 5,580,146 A * | 12/1996 | Maslow ............................ 353/74 |
| 6,059,412 A | 5/2000 | Sugita |
| 7,670,009 B2 | 3/2010 | Hirata et al. |
| 8,040,602 B1 * | 10/2011 | Hochendoner ............... 359/443 |
| 8,300,311 B2 * | 10/2012 | Jelusic et al. ................. 359/451 |
| 8,388,147 B2 * | 3/2013 | Murata et al. .................. 353/79 |
| 2007/0171383 A1 * | 7/2007 | Deves ............................. 353/79 |
| 2009/0115972 A1 * | 5/2009 | Aizawa et al. ................. 353/74 |
| 2010/0165303 A1 | 7/2010 | Murata et al. |
| 2010/0188642 A1 * | 7/2010 | Falendysz ............. G03B 21/14 353/79 |
| 2011/0188007 A1 * | 8/2011 | Okura et al. ................... 353/77 |

FOREIGN PATENT DOCUMENTS

| JP | 59-3664 Y2 | 2/1984 |
| JP | 05-336479 | * 12/1993 |

(Continued)

*Primary Examiner* — Steven H Whitesell Gordon
*Assistant Examiner* — Jerry Brooks
(74) *Attorney, Agent, or Firm* — Birch, Stewart, Kolasch & Birch, LLP

(57) ABSTRACT

A video projection device includes an optical engine which projects video light, an aspherical mirror which reflects the video light projected by the optical engine with a reflective surface formed in a rotationally symmetrical shape centering on an optical axis, a reflective screen on which the video light reflected by the aspherical mirror is projected, a shielding housing which houses the optical engine, the aspherical mirror, and an electric circuit portion which electrically drives the optical engine, and a strut member which connects a rear surface portion of the shielding housing, and a rear surface portion of the reflective screen in a state where the rear surface portion of the shielding housing and the rear surface portion of the reflective screen are positioned.

11 Claims, 15 Drawing Sheets

(56) References Cited

FOREIGN PATENT DOCUMENTS

| | | |
|---|---|---|
| JP | 5-336479 A | 12/1993 |
| JP | 7-306474 A | 11/1995 |
| JP | 8-46899 A | 2/1996 |
| JP | 8-88821 A | 4/1996 |
| JP | 10-319501 A | 12/1998 |
| JP | 2002-82387 A | 3/2002 |
| JP | 2002-311506 A | 10/2002 |
| JP | 2005-292210 A | 10/2005 |
| JP | 2008-65018 A | 3/2008 |
| JP | 4279315 B2 | 6/2009 |
| JP | 2010-152123 A | 7/2010 |
| JP | 2011-164150 A | 8/2011 |

* cited by examiner

F I G. 1 3
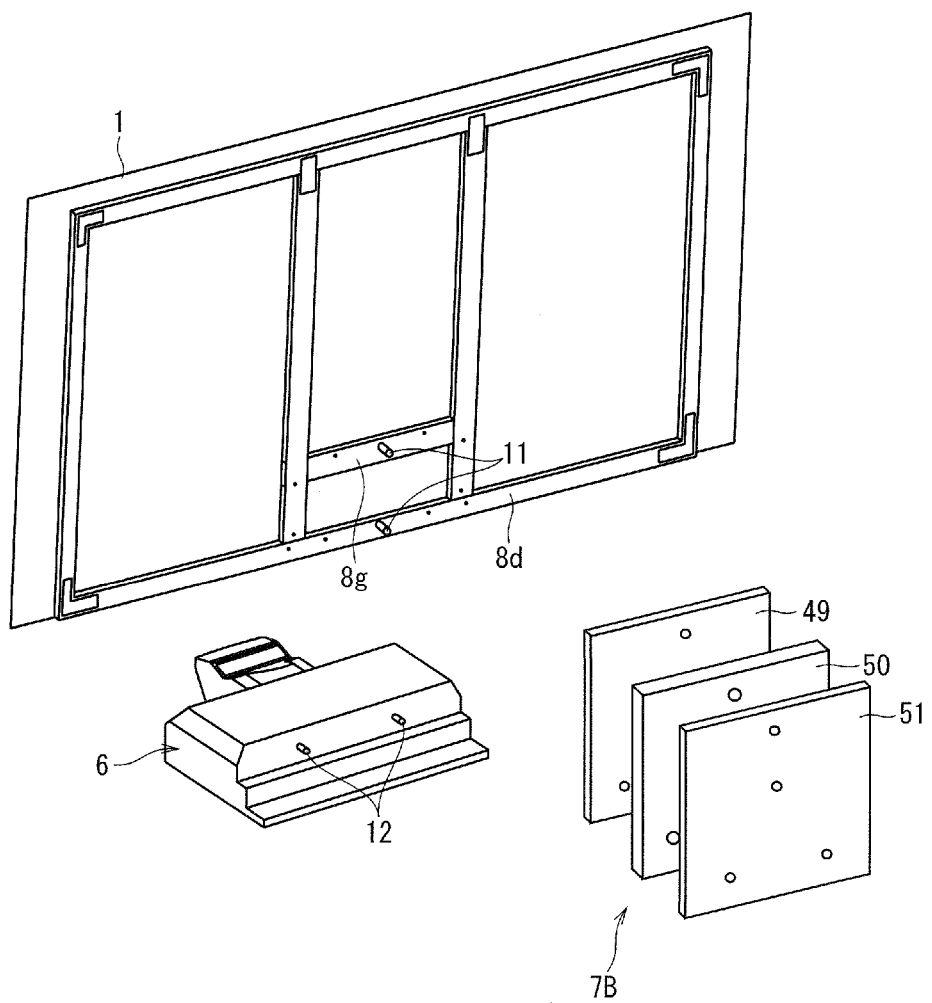

VIDEO PROJECTION DEVICE

BACKGROUND OF THE INVENTION

Field of the Invention

The present invention relates to a video projection device that displays, on a large-sized reflective screen, a video enlarged and projected from an optical engine including a reflective image forming element such as a DMD.

Description of the Background Art

For example, a reflective front projector described in Japanese Patent Application Laid-open. No. H05-336479 (1993) includes a console housing in which a projection unit emitting video light and an electric circuit portion are installed, a large-sized reflective screen is fixed to the front upper part of the console housing, and a plane mirror which reflects the video light emitted from the projection unit is arranged on the front part of the console housing. This reflective front projector is configured such that the reflective screen fixed to the front upper part of the console housing is housed in the console housing when the reflective front projector is not used as a projector because a video is not seen.

The plane mirror reflecting the video light is installed on a movable front board with respect to the console housing, and the front board is housed in the console housing when the reflective front projector is not used as a projector. After the reflective screen and the front board with the plane mirror installed thereon are housed in the console housing, the reflective front projector can be used as a box-shaped TV stand since the top surface of the console housing is flat, and space saving of the device when not used as a projector is realized.

Such a device has a problem that, each time a video is seen, it is necessary to take out the housed screen from the console housing and pull out the housed front board with the plane mirror installed thereon, which requires time and effort. Additionally, the device has a problem that the front board is opened at the time of use, scattered light of projection light from the projection unit toward the plane mirror affects a screen surface, and the resolution feeling of a video projected on the screen is lowered. Furthermore, it has been demanded that screen distortion on the screen is reduced as small as possible.

SUMMARY OF THE INVENTION

An object of the present invention is to provide a video projection device that realizes reduction in thickness and space saving of the device, and is capable of obtaining an optimum video with small screen distortion and good resolution feeling on a large-sized screen.

A video projection device according to the present invention includes: an optical engine that projects video light; a reflective optical element that reflects the video light projected by the optical engine with a reflective surface formed in a rotationally symmetrical shape centering on an optical axis; and a reflective screen on which the video light reflected by the reflective optical element is projected. The video projection device further includes: a shielding housing that houses the optical engine, the reflective optical element, and an electric circuit portion that electrically drives the optical engine; and a strut member that connects a rear surface portion of the shielding housing, and a rear surface portion of the reflective screen in a state where the rear surface portion of the shielding housing and the rear surface portion of the reflective screen are positioned.

According to the present invention, the size of the shielding housing may be the size necessary for housing the optical engine, the reflective optical element, and the electric circuit portion, and hence the shielding housing can be downsized. Additionally, since the reflective optical element reflected with the reflective surface formed in the rotationally symmetrical shape centering on the optical axis is used in order to reflect the video light projected by the optical engine, the protruding amount of the shielding housing from the front surface of the reflective screen is reduced. Consequently, reduction in thickness and space saving of the video projection device can be realized.

Furthermore, since the rear surface portion of the shielding housing and the rear surface portion of the reflective screen are connected by the strut member while being positioned, the positional relation between the reflective screen and the optical engine housed in the shielding housing can be accurately positioned through the strut member. Consequently, an optimum video with small screen distortion and good resolution feeling can be obtained on the reflective screen.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a rear perspective view showing the connecting structure of the video projection device in the case of employing transparent resin members and a transparent glass member for the strut member;

DESCRIPTION OF THE PREFERRED EMBODIMENTS

First Preferred Embodiment

Figure 1:
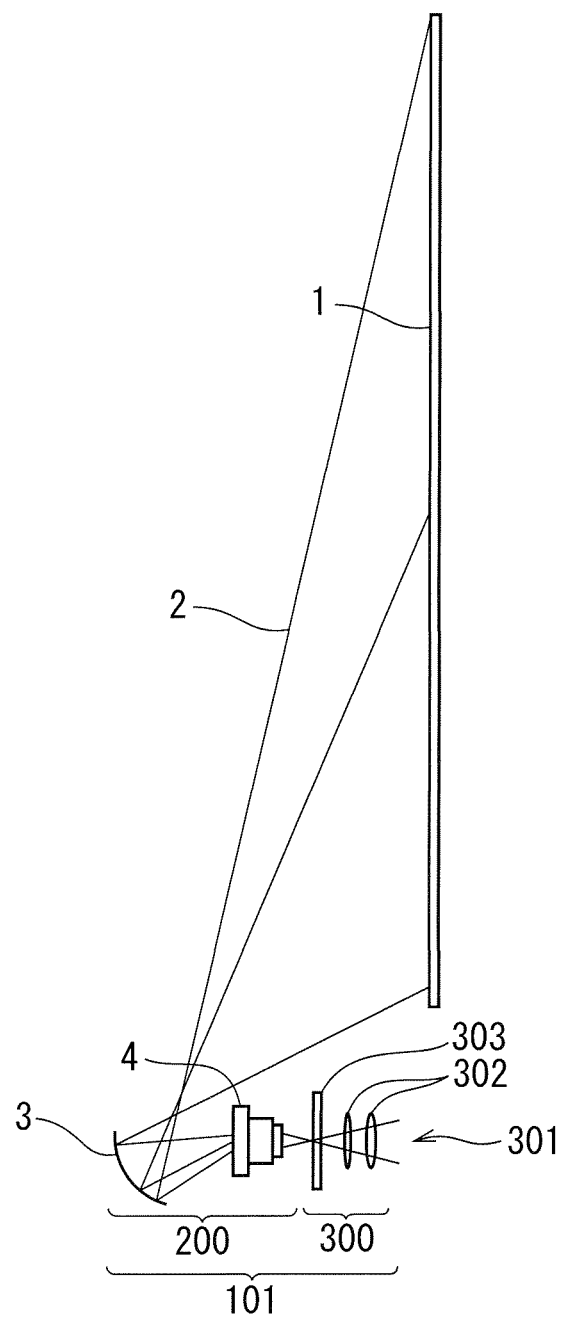
FIG. 1 is a schematic diagram showing an optical layout of a video projection device according to a first preferred embodiment.

A first preferred embodiment of the present invention will be hereinafter described with reference to the drawings. FIG. 1 is a schematic diagram showing an optical layout of a video projection device according to the first preferred embodiment of the present invention. As shown in FIG. 1, the video projection device includes a projection unit 101 having a projection optical system 200 and an illumination optical system 300, and a reflective screen 1. The illumination optical system 300 includes a light source unit 301, a lens 302, and an image display element 303, and the projection optical system 200 includes a projection lens 4, and an aspherical mirror 3 (reflective optical element).

The light source unit 301 is, for example, a lamp light source, a laser light source, or an LED light source. The lens 302 collects light applied by the light source unit 301. The image display element 303, which is, for example, a liquid crystal element or a DMD, reflects or transmits light emitted from the lens 302, so that the light is spatially modulated to video light and emitted.

The projection lens 4 enlarges and projects the video light emitted by the image display element 303. The aspherical mirror 3 reflects, in a prescribed direction, the video light projected by the projection lens 4 on a reflective surface formed in a rotationally symmetrical shape centering on an optical axis. Video light 2 reflected by the aspherical mirror 3 is projected on the reflective screen 1.

Figure 2A:
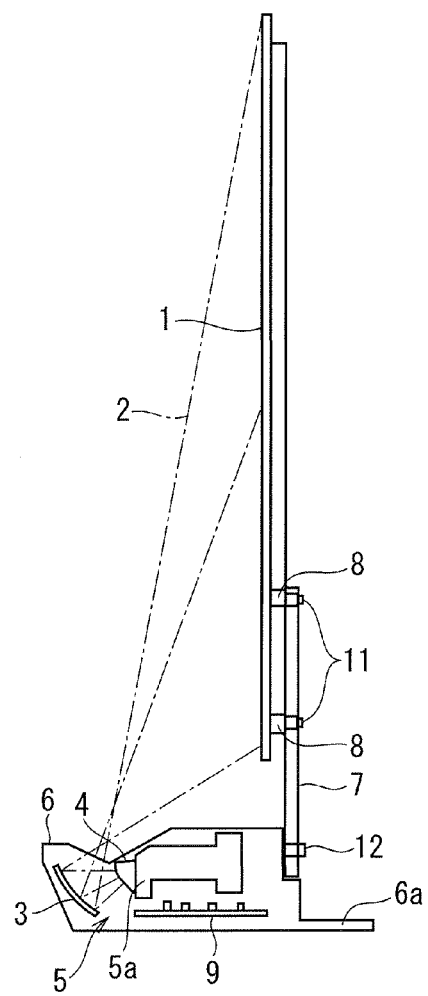
FIG. 2A is a side view showing an inner structure of the video projection device.
Figure 2B:
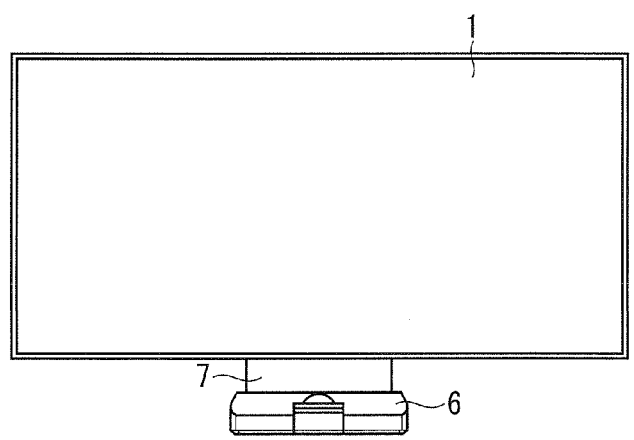
FIG. 2B is a front view of the video projection device.

The inner structure of the video projection device will be now described. FIG. 2A is a side view showing an inner structure of the video projection device, and FIG. 2B is a front view of the video projection device. As shown in FIG. 2A and FIG. 2B, the video projection device includes, in addition to the configuration described with reference to FIG. 1, an electric circuit portion 9 which electrically drives an optical engine 5, a shielding housing 6 which houses the optical engine 5 including the aspherical mirror 3 and the electric circuit portion 9, and a strut member 7. Here, the optical engine 5 is mounted with the projection unit 101. The description will be made by assuming that the left and the right in the plane of drawing of FIG. 2A are the front side and the back side, respectively.

The aspherical mirror 3 is housed in the front part inside the shielding housing 6, and a body portion 5a of the optical engine 5 and the projection lens 4 are housed in the central part inside the shielding housing 6. The strut member 7 is fixed to the rear surface portion of the shielding housing 6.

The reflective screen 1 is formed from a resin member, and therefore warpage of the reflective screen 1 occurs when the size of the reflective screen 1 is particularly large. In order to correct the warpage of the reflective screen 1 and maintain the planarity of the reflective screen 1, a screen reinforcing frame 8 is fixed to the rear surface portion of the reflective screen 1 and the strut member 7 is fixed to the screen reinforcing frame 8. This maintains planarity of the reflective screen 1, and hence the video light 2 projected from the projection lens 4 and reflected by the aspherical mirror 3 is normally imaged on the reflective screen 1.

A protrusion portion 6a which protrudes rearward from the lower end of the rear surface portion of the shielding housing 6 is provided such that the video projection device does not fall on the rear surface side. The reflective screen 1 is connected to the rear surface portion of the shielding housing 6 through the strut member 7, and the aspherical mirror 3 is used for reflection of the video light 2 from the projection lens 4, so that the protruding amount of the shielding housing 6 with respect to the front surface of the reflective screen 1 is reduced. The shielding housing 6 has a compact size in which only the optical engine 5 including the aspherical mirror 3 and the electric circuit portion 9 are housed, the width of the shielding housing 6 is about ⅓ of the width of the reflective screen 1. The strut member 7 has such a size as to be capable of supporting the central part of the rear surface of the reflective screen 1, the width of the strut member 7 is approximately the same as the width of the shielding housing 6. Regardless of the video projection device mounted with the large-sized reflective screen 1, reduction in thickness and space saving are realized.

Figure 3:
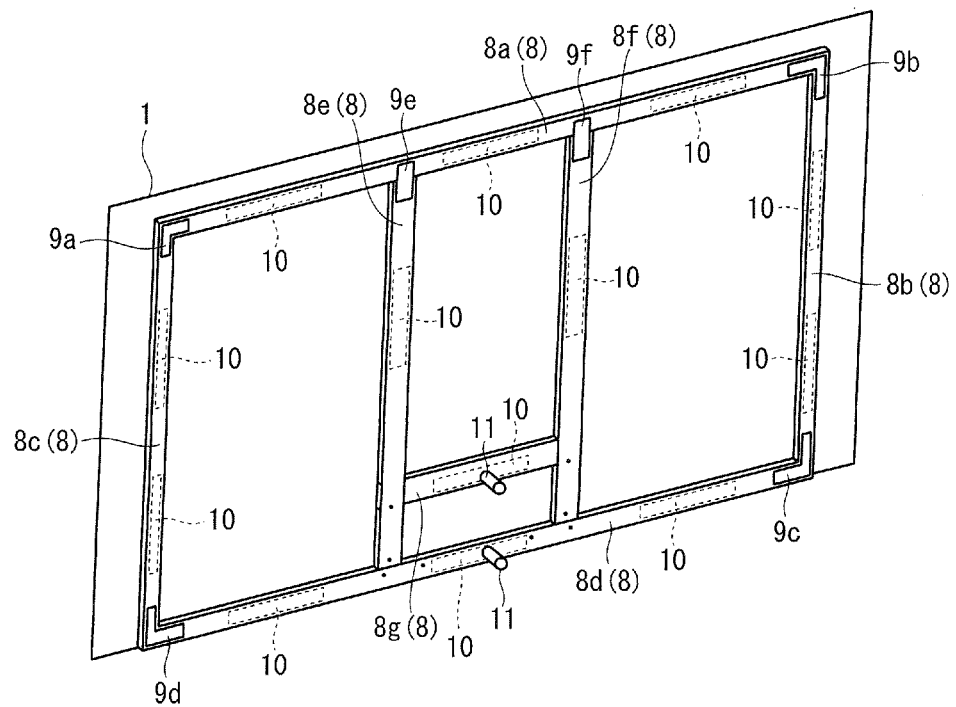
FIG. 3 is a rear perspective view of a reflective screen.

The structure of the rear surface portion of the reflective screen 1 will be now described in detail with reference to FIG. 3. FIG. 3 is a rear perspective view of the reflective screen 1. The screen reinforcing frame 8 is fixed to the rear surface portion of the reflective screen 1 with bonding members 10. More specifically, in the rear surface portion of the rectangular reflective screen 1, a screen reinforcing frame 8a is fixed to an upper end thereof with the bonding members 10, a screen reinforcing frame 8b is fixed to a left end thereof with the bonding members 10, and a screen reinforcing frame 8c is fixed to a right end thereof with the bonding members 10. In the rear surface portion of the reflective screen 1, screen reinforcing frames 8e, 8f are fixed to a central part thereof with the bonding members 10, and a screen reinforcing frame 8g is fixed between the screen reinforcing frames 8e, 8f with the bonding member 10.

A part between the screen reinforcing frames 8a, 8b is fixed with a connecting member 9b, a part between the screen reinforcing frames 8a, 8c is fixed with a connecting member 9a, a part between the screen reinforcing frames 8b, 8d is fixed with a connecting member 9c, and a part between the screen reinforcing frames 8c, 8d is fixed with a connecting member 9d.

A part between the screen reinforcing frames 8a, 8e is fixed with a connecting member 9e, a part between the screen reinforcing frames 8a, 8f is fixed with a connecting member 9f. As described above, since the reflective screen 1 is formed by the resin member, warpage occurs on the reflective screen 1 in a single body, and planarity cannot be maintained. The screen reinforcing frames 8a, 8b, 8c, 8d, 8e, 8f, 8g are fixed to the rear surface portion of the reflective screen 1 while being connected, so that the warpage of the reflective screen 1 can be corrected, and the planarity can be maintained.

The parts between the screen reinforcing frames 8a, 8b, 8c, 8d, 8e, 8f, 8g are fixed with the connecting members 9a, 9b, 9c, 9d, 9e, 9f, thereby maintaining strength and rigidity of the whole of the screen reinforcing frames 8a, 8b, 8c, 8d, 8e, 8f, 8g. The central parts of the screen reinforcing frame 8d and the screen reinforcing frame 8g are mounted with respective positioning pins 11 for positioning with respect to the strut member 7.

Figure 4:
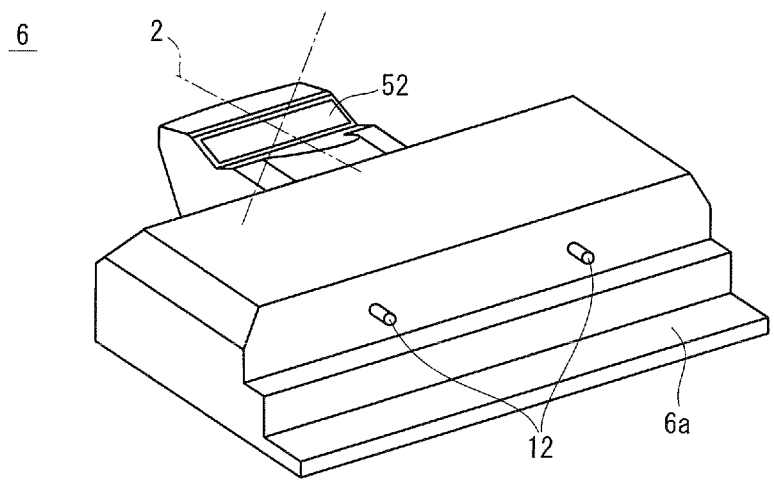
FIG. 4 is a rear perspective view of a shielding housing.

The shielding housing 6 which houses the optical engine 5 including the aspherical mirror 3 and the electric circuit portion 9 will be described. First, the structure as viewed from the rear surface of the shielding housing 6 will be described. FIG. 4 is a rear perspective view of the shielding housing 6. As shown in FIG. 4, for example, two positioning pins 12 for positioning with respect to the strut member 7 are provided on the upper part of the rear surface portion of the shielding housing 6. As described above, the protrusion portion 6a which protrudes rearward is provided on the lower end of the rear surface portion of the shielding housing 6. An area where the video light 2 reflected on the aspherical mirror 3 intersects is present in the front upper part of the shielding housing 6, and a window pane 52 is mounted on this area. The window pane 52 is arranged in the area where the video light 2 intersects, and hence the size of the window pane 52 is small.

Figure 5:
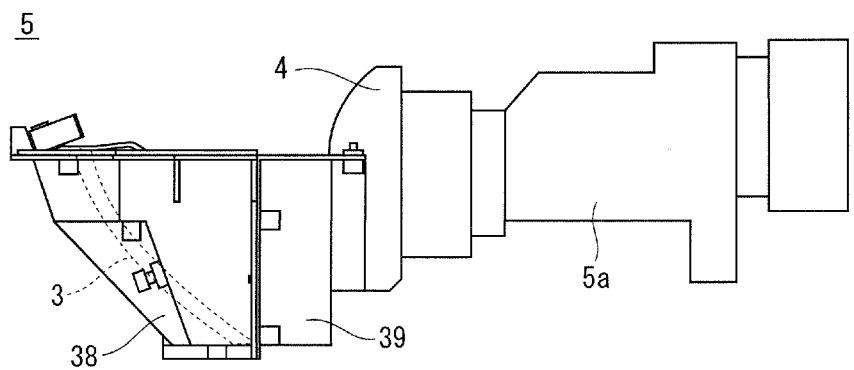
FIG. 5 is a side view of an optical engine.
Figure 6:
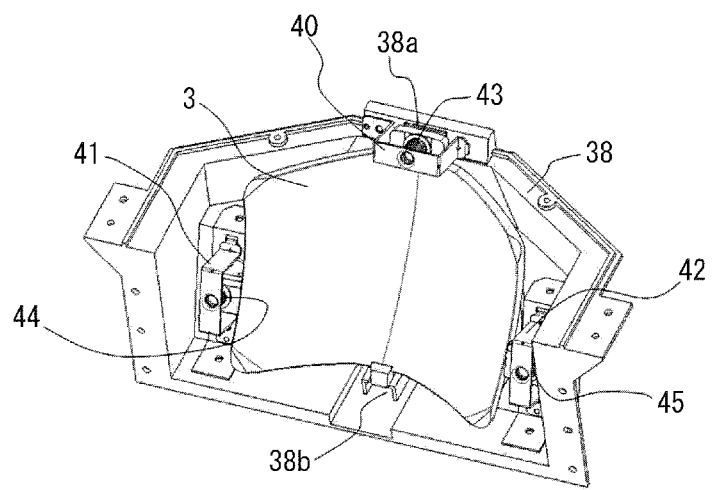
FIG. 6 is a rear perspective view of a holding structure of an aspherical mirror.
Figure 7:
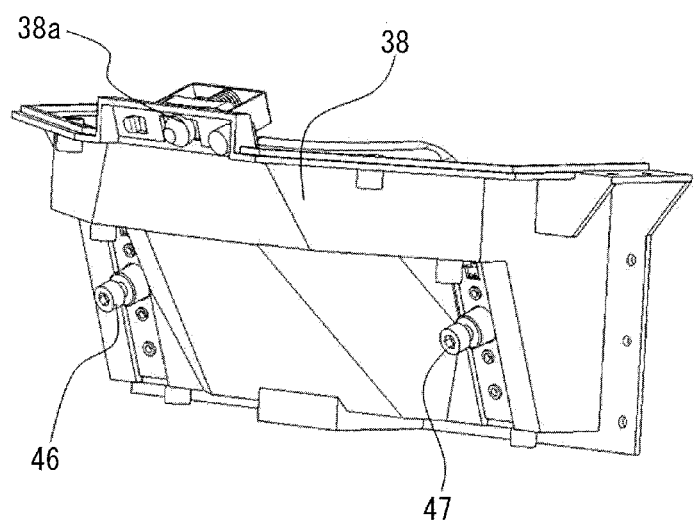
FIG. 7 is a perspective view of the holding structure of the aspherical mirror.

The holding structure of the aspherical mirror 3 housed in the shielding housing 6 will be now described. FIG. 5 is a side view of the optical engine 5, FIG. 6 is a rear perspective view of the holding structure of the aspherical mirror 3, and FIG. 7 is a perspective view of the holding structure of the aspherical mirror 3. As shown in FIG. 5, the rear part of the projection lens 4 is fixed to the front end of the body portion 5a, and the front part of the projection lens 4 is fixed to a projection lens holding member 39. The aspherical mirror 3 is fixed to an aspherical mirror holding member 38, and the aspherical mirror holding member 38 is fixed to the projection lens holding member 39.

As shown in FIG. 6 and FIG. 7, the holding structure of the aspherical mirror 3 includes the aspherical mirror 3, the aspherical mirror holding member 38, an aspherical mirror pivot-shaped holding portion 38a, springs 43, 44, 45, aspherical mirror adjustment screws 46, 47 serving as adjustment portions, and spring pressing members 40, 41, 42.

The front end of the aspherical mirror 3 is arranged so as to make contact with the apical surface of the aspherical mirror pivot-shaped holding portion 38a of the aspherical mirror holding member 38, the right and left ends of the aspherical mirror 3 are arranged on the apical surfaces of the aspherical mirror adjustment screws 46, 47 incorporated in the aspherical mirror holding member 38, and the rear end of the aspherical mirror 3 is inserted in an aspherical mirror guide-shaped holding portion 38b. In the front end and the right and left ends of the aspherical mirror 3, the spring pressing members 40, 41, 42 fixed to the aspherical mirror holding member 38 through springs 43, 44, 45 regulate rearward movement with respect to the spring pressing members 40, 41, 42.

The aspherical mirror holding member 38 may be a die-cast article made of aluminum, magnesium, or the like, or a molded article made of resin or the like. In the adjustment portions of the aspherical mirror 3, the aspherical mirror adjustment screws 46, 47 are rotated around a pivot portion, serving as a supporting point, of the aspherical mirror pivot-shaped holding portion 38a in a clockwise direction or in a counterclockwise direction, thereby vertically moving installation portions of the aspherical mirror adjustment screws 46, 47. Thus, the aspherical mirror 3 moves, and video distortion on the reflective screen 1 can be adjusted. Particularly, it is possible to correct the video position on upper right and left corners of the reflective screen 1, which are particularly long optical path.

Figure 8:
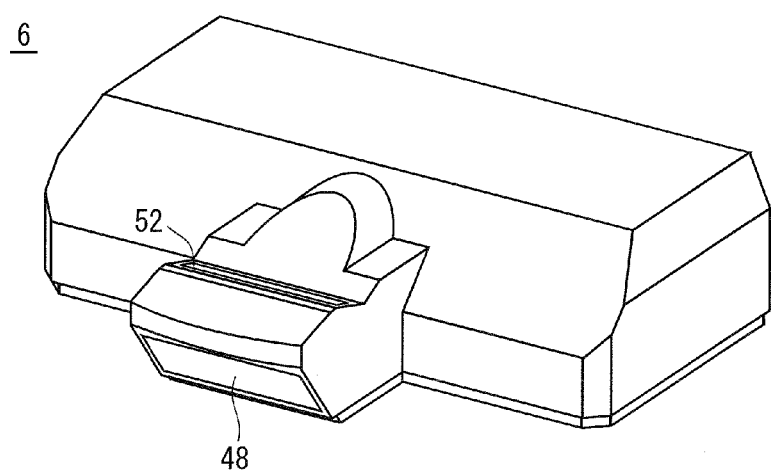
FIG. 8 is a perspective view showing a state where a lid member is mounted on a front part of the shielding housing.
Figure 9:
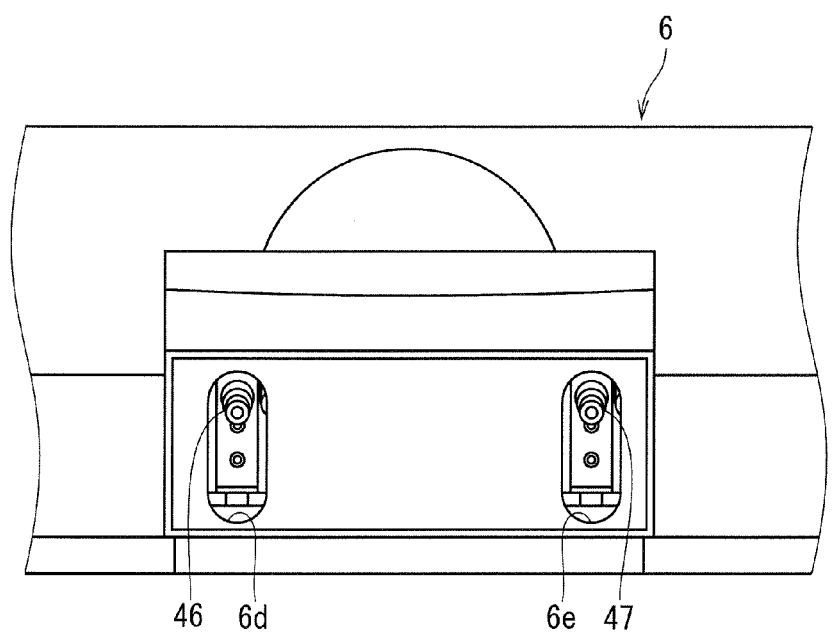
FIG. 9 is a front view showing a state where the lid member is detached from the shielding housing.

With reference to FIG. 8 and FIG. 9, the structure in which the aspherical mirror adjustment screws 46, 47 serving as the adjustment portions of the aspherical mirror 3 are exposed from the shielding housing 6 will be now described. FIG. 8 is a perspective view showing a state where a lid member 48 is mounted on the front part of the shielding housing 6, and FIG. 9 is a front view showing a state where the lid member 48 is detached from the shielding housing 6. As shown in FIG. 8 and FIG. 9, opening portions 6d, 6e are formed on the front part of the shielding housing 6, and the lid member 48 is mounted so as to cover the opening portions 6d, 6e. The lid member 48 can be easily detached externally. As shown in FIG. 9, the opening portions 6d, 6e are exposed by detaching the lid member 48, and hence it is possible to externally access the aspherical mirror adjustment screw 46 through the opening portion 6d, and externally access the aspherical mirror adjustment screw 47 through the opening portion 6e, thereby enabling adjustment work of the aspherical mirror 3.

The shielding housing 6 housing the optical engine 5 and the reflective screen 1 are connected by the strut member 7 while being positioned. When the reflective screen 1 falls in a front/back direction, the sensitivity of the upper part of the reflective screen 1 is particularly high, and therefore the position of the screen varies vertically, and screen distortion may occur. Thus, when the screen distortion occurs on the upper part of the reflective screen 1 with high sensitivity, it is possible to access the adjustment portions of the aspherical mirror 3 from the outside of the video projection device. Hence, image distortion of the video on the reflective screen 1 can be adjusted without separating the shielding housing 6 from the video projection device, and an optimum video can be obtained.

Figure 10:
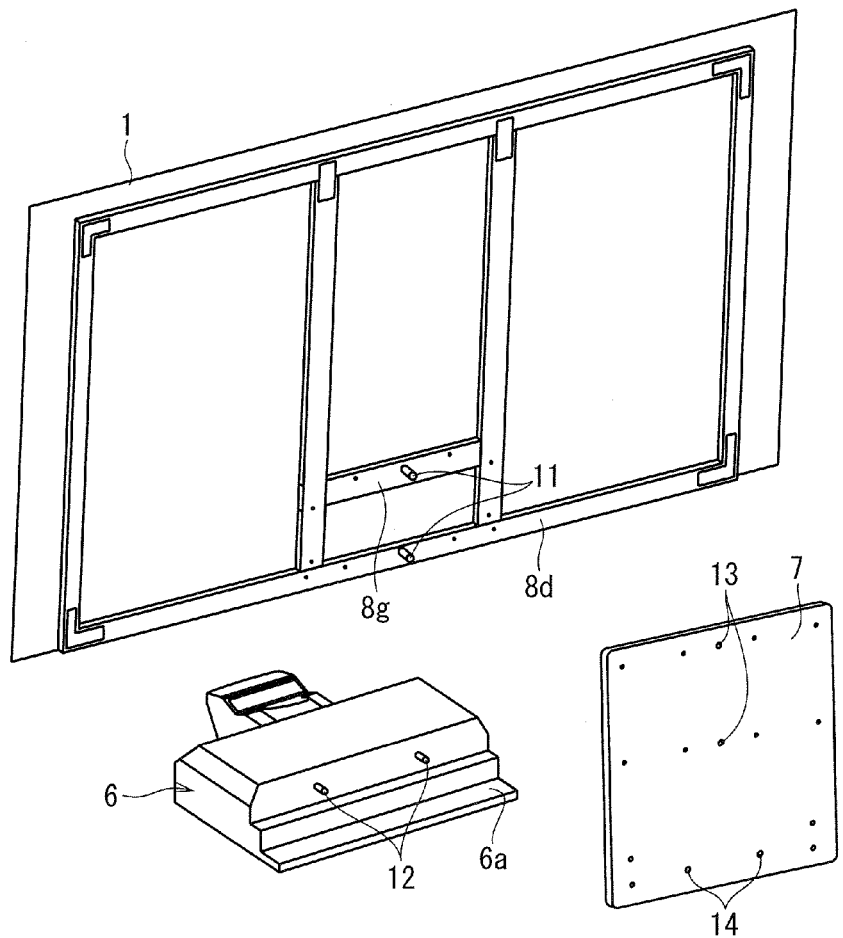
FIG. 10 is a rear perspective view showing a connecting structure of the video projection device.

The connection of the reflective screen 1, the shielding housing 6, and the strut member 7 will be now described. FIG. 10 is a rear perspective view showing the connecting structure of the video projection device. As shown in FIG. 10, the strut member 7 is formed in a rectangle and a plate shape. The strut member 7 is provided with positioning holes 13 and positioning holes 14, and the positioning pins 11 provided on the central parts of the screen reinforcing frames 8d, 8g are inserted in the positioning holes 13 from the front. The positioning pins 12 provided on the rear surface portion of the shielding housing 6 are inserted in the positioning holes 14 from the front. Consequently, the positional relation between the reflective screen 1 and the shielding housing 6 housing the optical engine 5 can be determined.

Then, the inner peripheral part of the strut member 7 is fixed to the screen reinforcing frame 8 and the rear surface portion of the shielding housing 6 with screws, thereby achieving an integrated video projection device shown in FIG. 2A and FIG. 2B. The positional relation between the reflective screen 1 and the optical engine 5 housed and arranged in the shielding housing 6 is determined through the strut member 7, and hence an optimum video with small screen distortion and good resolution feeling can be obtained on the reflective screen 1. As a member constituting the strut member 7, a metal plate with high rigidity and excellent flatness, an extrusion material, or the like is suitable.

As described above, in the video projection device according to the first preferred embodiment, the size of the shielding housing 6 may be the size necessary for housing the optical engine 5 including the aspherical mirror 3 and the electric circuit portion 9, and hence the shielding housing 6 can be downsized. Additionally, the aspherical mirror 3 is used in order to reflect the video light projected by the optical engine 5, and hence the protruding amount of the shielding housing 6 from the front surface of the reflective screen 1 is reduced. Consequently, reduction in thickness and space saving of the video projection device can be realized.

Furthermore, the rear surface portion of the shielding housing 6 and the rear surface portion of the reflective screen 1 are connected by the strut member 7 while being positioned, and hence the positional relation between the reflective screen 1 and the optical engine 5 housed in the shielding housing 6 can be accurately positioned through the strut member 7. Consequently, an optimum video with small screen distortion and good resolution feeling can be obtained on the reflective screen 1.

The video projection device further includes the aspherical mirror adjustment screws 46, 47 capable of adjusting the angle of reflection of the video light on the aspherical mirror 3 with respect to the reflective screen 1, and the opening portions 6d, 6e from which the aspherical mirror adjustment screws 46, 47 are exposed are formed on the front part of the shielding housing 6. Hence, image distortion of the video on the reflective screen 1 can be adjusted without separating the shielding housing 6 from the video projection device, and an optimum video can be obtained.

Figure 11:
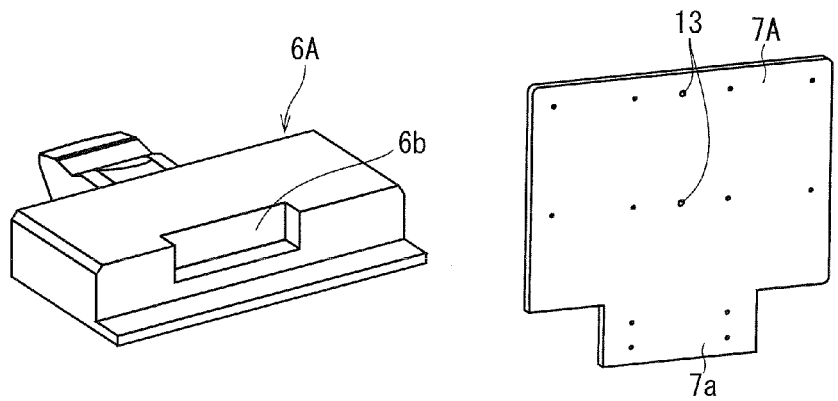
FIG. 11 is a rear perspective view showing another example of the connecting structure of the shielding housing and a strut member.

As the connecting structure of the shielding housing and the strut member, a connecting structure shown in FIG. 11 may be employed. FIG. 11 is a rear perspective view showing the connecting structure of a shielding housing 6A and a strut member 7A, which shows another example of the connecting structure of the shielding housing and the strut member. An upward open depression 6b is formed on the upper part of the rear surface portion of the shielding housing 6A. A positioning outline portion 7a is formed on the lower end of the strut member 7A. The positioning outline portion 7a is formed so as to be capable of being fitted in the depression 6b.

When the strut member 7A is connected to the shielding housing 6A, the positioning outline portion 7a of the strut member 7A is mounted so as to be fitted in the depression 6b of the shielding housing 6A. Then, the strut member 7A is fixed to the shielding housing 6A from the rear surface side with screws.

As described above, the upward open depression 6b is formed on the rear surface portion of the shielding housing 6A, and the positioning outline portion 7a on the lower end of the strut member 7A and the depression 6b are positioned. Hence, assembling work of the strut member 7A and the shielding housing 6A is facilitated.

Figure 12:
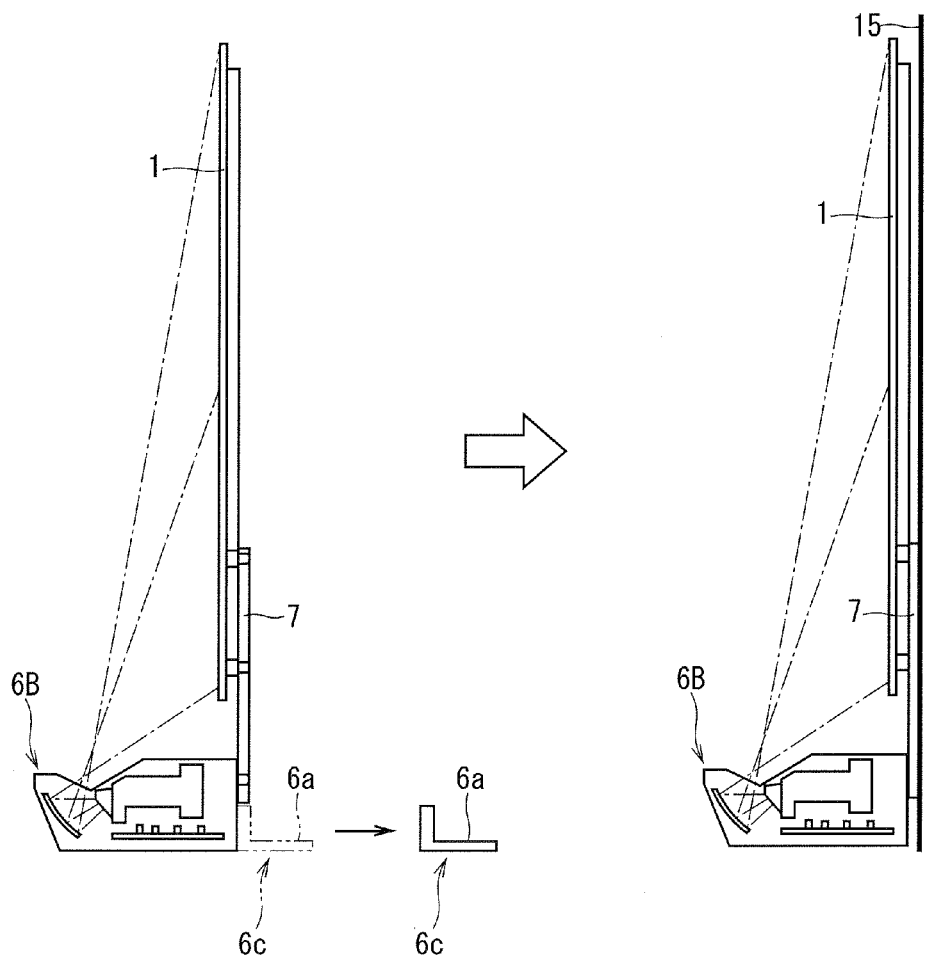
FIG. 12 is a side view showing a state where the video projection device is installed to make contact with a wall surface after a detachable portion is detached.

In the case of a video projection device mounted with a large-sized screen, there is a demand to install the large-sized screen displaying a video as close as possible to a wall. As shown in FIG. 12, a detachable portion 6c which is detachably fixed to the shielding housing 6B with screws or the like and has a protrusion portion 6a (first protrusion portion) protruding so as to enable the video projection device to self-stand is provided on the lower part of the rear surface portion of the shielding housing 6B. When the video projection device is desired to be located as close as possible to the wall, the detachable portion 6c is detached, and the video projection device can be installed in a state where the rear surface portion of the strut member 7 is in contact with a wall surface 15. Since the reflective screen 1 is arranged close to the wall, an image in which the reflective screen 1 is hung on the wall surface 15 is obtained, and the protruding amount to the inside of a room is reduced, thereby enabling further space saving of the video projection device.

Generally, construction work for the wall, or installation of a holding member for wall hanging is required in order to hang the video projection device on the wall. However, according to the configuration of the present preferred embodiment, it is possible to avoid such troublesome work, and arrange the reflective screen 1 close to the wall. The detachable portion 6c has a function of the protrusion portion 6a shown in FIG. 2A, namely, the function so as not to make the video projection device fall on the rear surface side. In the case where the video projection device is installed close to the wall surface 15, the strut member 7 is installed while making contact with the wall surface 15 after the detachable portion 6c is detached, as shown in FIG. 12. Consequently, the video projection device is prevented from falling on the rear surface side.

As described above, the video projection device further includes the detachable portion 6c which is provided so as to be detachable from the shielding housing 6B and has the protrusion portion 6a protruding from the rear surface portion of the shielding housing 6B in a self-standing manner. Hence, the detachable portion 6c is detached from the shielding housing 6B when the video projection device is installed close to the wall, thereby enabling the video projection device to be installed in a state where the rear surface portion of the strut member 7 is brought into contact with the wall surface 15. Additionally, since the rear surface portion of the strut member 7 is in contact with the wall surface 15, the video projection device is prevented from falling on the rear surface side.

Figure 14:
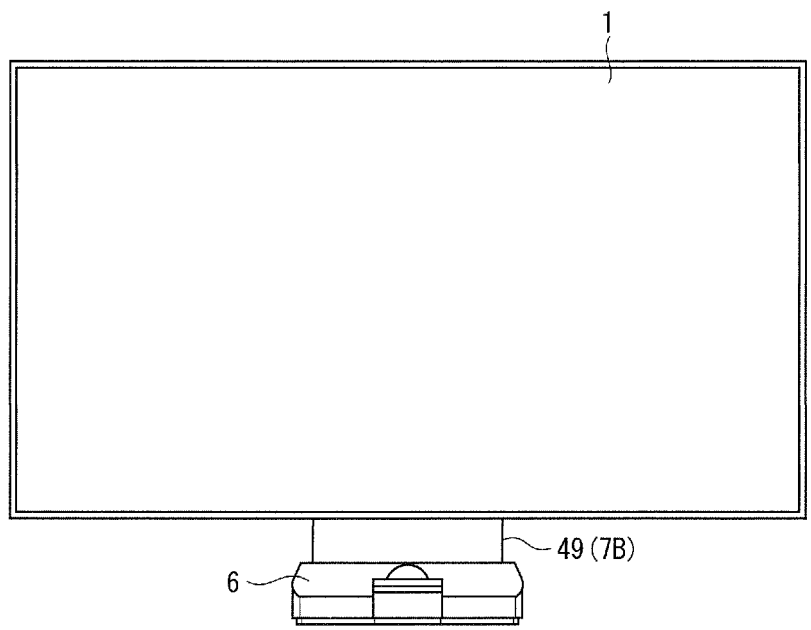
FIG. 14 is a front view of the video projection device.
Figure 15:
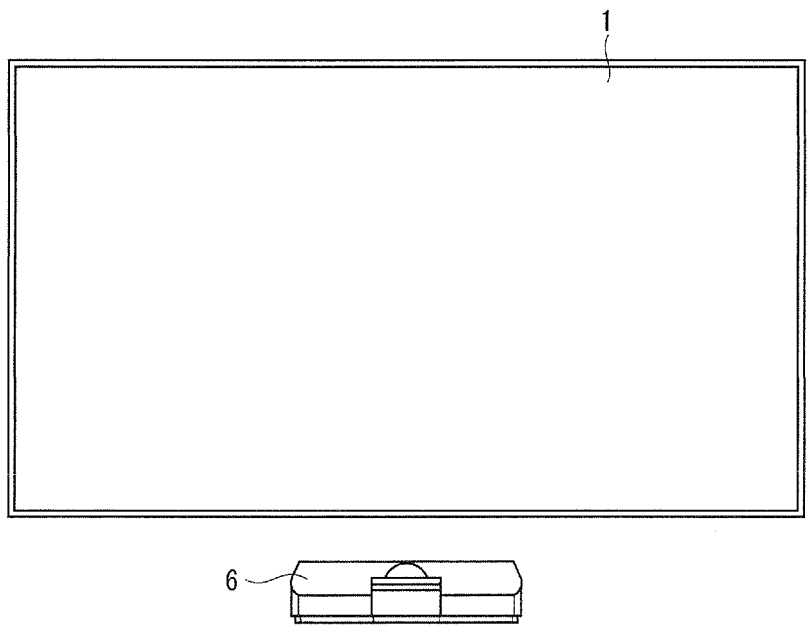
FIG. 15 is a front view of the video projection device, which illustrates a floating image of a video projected on the reflective screen.

A transparent member may be employed for the strut member 7. FIG. 13 is a rear perspective view showing the connecting structure of the video projection device in the case where transparent resin members 49, 51 and a transparent glass member 50 are employed for the strut member 7. FIG. 14 is a front view of the video projection device. FIG. 15 is a front view of the video projection device, which illustrates a floating image of a video projected on the reflective screen 1.

As shown in FIG. 13, a strut member 7B is configured from three-layer structure including the transparent resin member 49, the transparent glass member 50, and the transparent resin member 51. The transparent glass member 50 is arranged on a layer at the center of the three-layer structure, and has a function of a strength member which supports the reflective screen 1. The transparent resin members 49, 51 are arranged to hold the transparent glass member 50 from the both end thereof, and protect the transparent glass member 50. Therefore, even if the transparent glass member 50 is broken, the broken pieces thereof can be prevented from scattering. Here, the transparent resin members 49, 51 and the transparent glass member 50 correspond to transparent members. As long as the transparent glass member 50 is subjected to surface protection treatment using a shatterproof film or the like, a single layer structure including only the transparent glass member 50 may be employed.

As shown in FIG. 14, the transparent resin members 49, 51 and the transparent glass member 50 are employed as the strut member 7B which connects the reflective screen 1 and the shielding housing 6. Since the strut member 7B is formed by the transparent members, a feeling that the reflective screen 1 is separated from the shielding housing 6 is obtained as shown in FIG. 15, and an image where the video projected on the reflective screen 1 floats can be realized.

As described above, the strut member 7B is formed by the transparent resin member 49, the transparent glass member 50, and the transparent resin member 51. Hence, the feeling that the reflective screen 1 is separated from the shielding housing 6 is obtained, and the image where the video projected on the reflective screen 1 floats can be realized. Consequently, a well-designed and novel video projection device is obtained.

Second Preferred Embodiment

Figure 16:
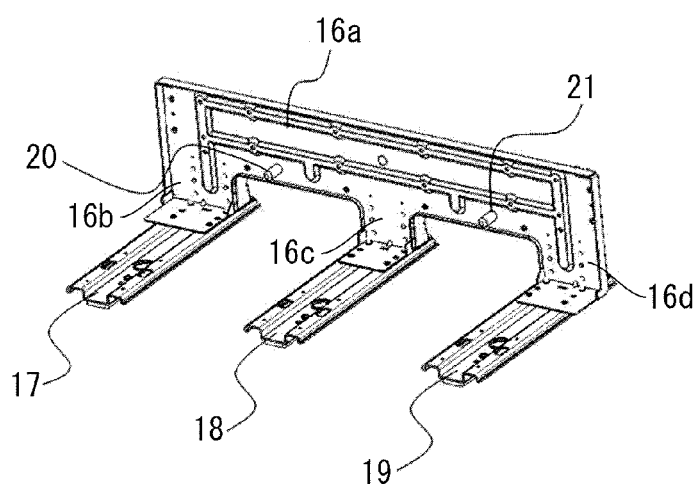
FIG. 16 is a perspective view of a frame member of a video projection device according to a second preferred embodiment.
Figure 17:
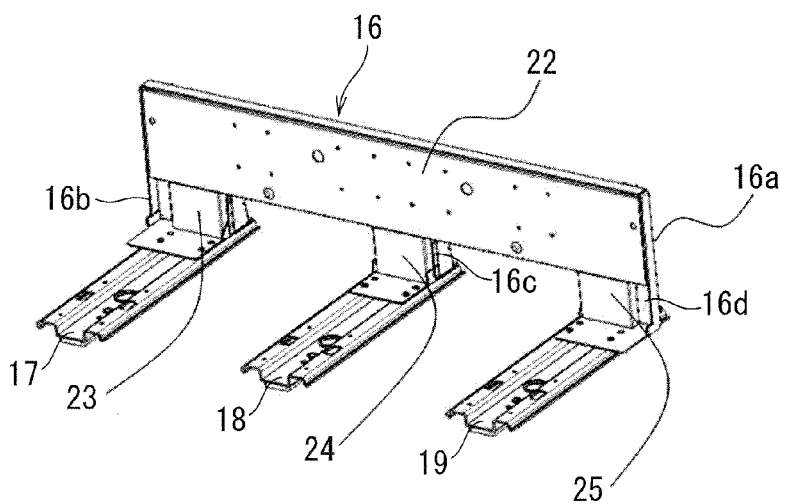
FIG. 17 is a perspective view showing a state where reinforcing members are mounted on the frame member.
Figure 18:
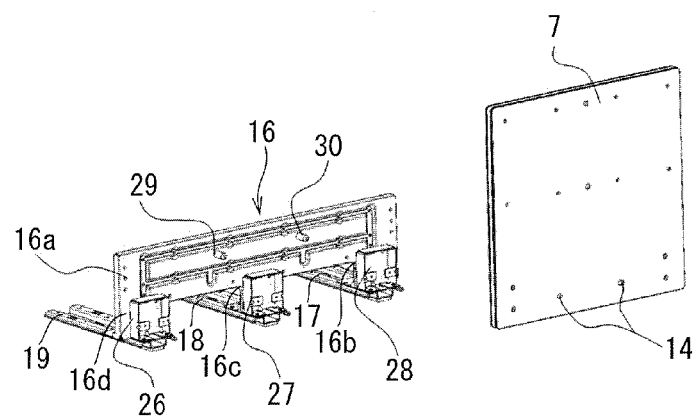
FIG. 18 is a rear perspective view showing the connecting structure of the frame member and a strut member.
Figure 19:
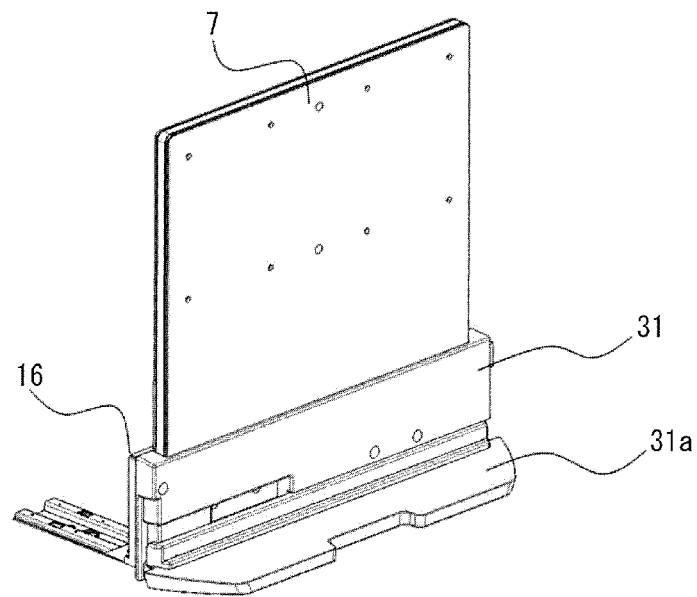
FIG. 19 is a rear perspective view showing a state where a back cover is mounted on a rear surface portion of the frame member.
Figure 20:
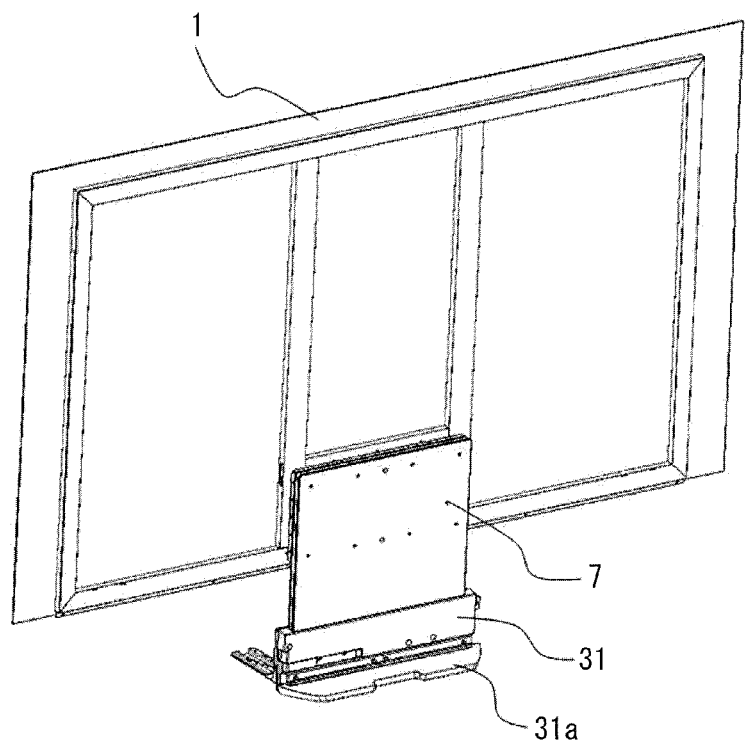
FIG. 20 is a rear perspective view showing a state where a reflective screen is mounted on the strut member in a self-standing manner.
Figure 21:
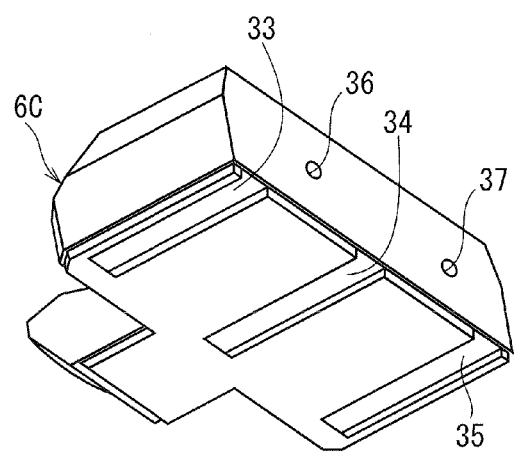
FIG. 21 is a perspective view as viewed from below of a shielding housing.
Figure 22:
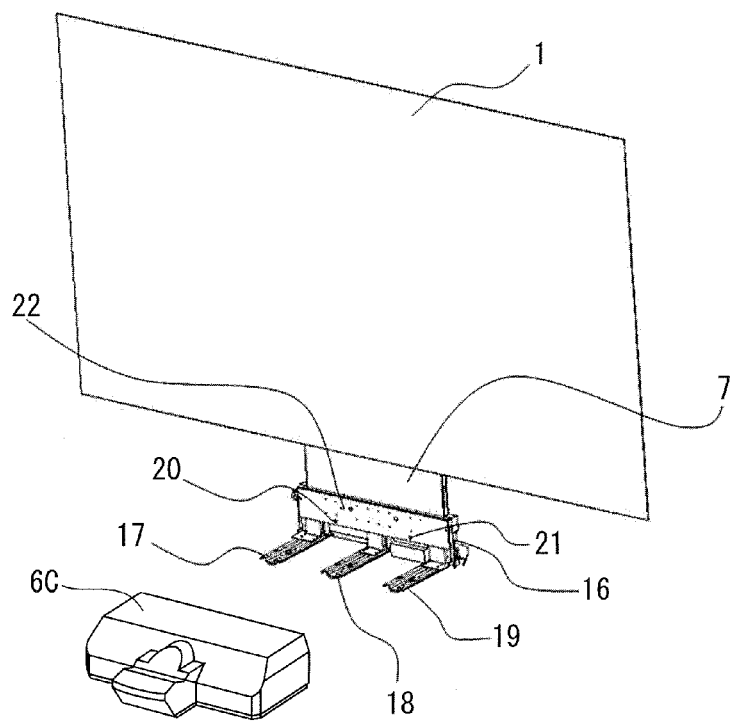
FIG. 22 is a perspective view illustrating the connection of the shielding housing and the frame member supporting the strut member to which the reflective screen is fixed.

A video projection device according to a second preferred embodiment will be now described. FIG. 16 is a perspective view of a frame member 16 of the video projection device according to the second preferred embodiment, FIG. 17 is a perspective view showing a state where the frame member 16 is mounted with reinforcing members 22, 23, 24, 25, FIG. 18 is a rear perspective view showing the connecting structure of the frame member 16 and a strut member 7, FIG. 19 is a rear perspective view showing a state where a back cover 31 is mounted on the rear surface portion of the frame member 16, FIG. 20 is a rear perspective view showing a state where the reflective screen 1 is mounted on the strut member 7 in a self-standing manner, FIG. 21 is a perspective view as viewed from below of a shielding housing 6C, and FIG. 22 is a perspective view illustrating the connection of the shielding housing 6C and the frame member 16 supporting the strut member 7 to which a reflective screen 1 is fixed. In the second preferred embodiment, the same components as those described in the first preferred embodiment will be denoted by the same reference numerals, and the description thereof will be omitted.

As shown in FIG. 16 and FIG. 22, the frame member 16 is a member detachably connected between the strut member 7 and the shielding housing 6C, and includes a frame body portion 16a, and frame leg portions 17, 18, 19 (second protrusion portions). The frame body portion 16a is formed in a rectangle, and the width of the frame body portion 16a is larger than the width of the strut member 7 so as to be capable of supporting the lower end of the strut member 7. Leg portions 16b, 16c, 16d are formed on the right and left ends and the lower end of the central part of the frame body portion 16a. The frame leg portions 17, 18, 19 protruding forward are fixed to the lower ends of the leg portions 16b, 16c, 16d, respectively.

Positioning pins 20, 21 are mounted near the right and left ends of the front surface of the frame body portion 16a. As shown in FIG. 17, the reinforcing member 22 is fixed to the front surface of the frame body portion 16a, and the reinforcing members 23, 24, 25 are fixed to the front surfaces of the leg portions 16b, 16c, 16d. The reinforcing member 22 improves the rigidity of the frame body portion 16a, and the reinforcing members 23, 24, 25 stabilize the angles formed by the frame body portion 16a and the frame leg portions 17, 18, 19. Here, the reinforcing member 22 has holes (not shown) formed at positions corresponding to the positioning pins 20, 21 of the frame body portion 16a, and the positioning pins 20, 21 protrude from these holes.

As shown in FIG. 18, reinforcing members 28, 27, 26 are fixed to the rear surface portion of the leg portions 16b, 16c, 16d, respectively. The reinforcing members 26, 27, 28 stabilize the angles formed by the frame body portion 16a and the frame leg portions 17, 18, 19. The positioning holes 14 of the strut member 7 are fitted around positioning pins 29, 30 of the frame body portion 16a from the rear surface side, thereby determining the positional relation between the strut member 7 and the frame member 16. Then, the strut member 7 is fixed to the frame member 16 from the rear surface side with screws.

As shown in FIG. 19, the back cover 31 serving as a cover member covering the rear surface side of the frame member 16 is fixed to the rear surface portion of the frame member 16. More specifically, the back cover 31 is fixed to the rear surface portion of the frame member 16 such that the frame body portion 16a, the reinforcing members 26, 27, 28, and the frame leg portions 17, 18, 19 are completely covered from the rear surface side. A protrusion portion 31a which protrudes rearward so as to enable the video projection device to self-stand is formed on the lower end of the back cover 31. Since the rear surface side of the frame member 16 can be covered with the back cover 31, a user does not directly touch the frame member 16 and the reinforcing members 26, 27, 28 with user's hands, and safety is enhanced.

As shown in FIG. 20, the frame leg portions 17, 18, 19 prevent the reflective screen 1 from falling on the front side. The protrusion portion 31a prevents the reflective screen 1 from falling on the back side. Accordingly, even in a state where the reflective screen 1 is fixed to the strut member 7, namely, the shielding housing 6C is not mounted (or, the shielding housing 6C is detached), the frame leg portions 17, 18, 19 of the frame member 16 fixed to the strut member 7, and the protrusion portion 31a of the back cover 31 enables the reflective screen 1 to self-stand.

As shown in FIG. 21, guide portions 33, 34, 35 extending in a front/back direction are formed on the right and left ends and the central part of the bottom surface portion of the shielding housing 6C. The rear surface portion of the shielding housing 6C is formed in a planar shape, and the protrusion portion described in the first preferred embodiment is not provided. Additionally, the rear surface portion of the shielding housing 6C is provided with positioning holes 36, 37.

As shown in FIG. 22, by sliding the shielding housing 6C from the front side, the frame leg portions 17, 18, 19 are fitted into the guide portions 33, 34, 35 provided on the bottom surface portion of the shielding housing 6C, respectively, and the rear surface portion of the shielding housing 6C comes into contact with the front surface of the reinforcing member 22. At this time, the positioning pins 20, 21 of the frame member 16 are inserted in the positioning holes 36, 37 provided on the rear surface portion of the shielding housing 6C, and the frame member 16 and the shielding housing 6C are positioned. Thereafter, the frame member 16 is fixed to the shielding housing 6C from the back cover 31 side with screws.

As a result, the strut member 7 and the shielding housing 6C housing an optical engine 5 are positioned by the frame member 16, and the strut member 7 is positioned by a screen reinforcing frame 8 arranged on the rear surface portion of the reflective screen 1. Hence, the positional relation between the reflective screen 1 and the optical engine 5 arranged inside the shielding housing 6C is determined. Consequently, an optimum video with small screen distortion and good resolution feeling can be obtained on the reflective screen 1.

When moving or conveying the video projection device, the shielding housing 6C is detached from the video projection device, and the shielding housing 6C and the reflective screen 1 supported by the strut member 7 and the frame member 16 are carried separately from each other. As shown in FIG. 20, the reflective screen 1 can self-stand, and has excellent insatiability. Even in the case where an electric circuit portion 9 and the optical engine 5 inside the shielding housing 6C are broken, the shielding housing 6C is separated from the video projection device, and only the inside of the shielding housing 6C can be repaired or maintained.

As described above, the video projection device according to the second preferred embodiment further includes the frame member 16 detachably connected between the strut member 7 and the shielding housing 6C, and having the frame leg portions 17, 18, 19 which protrude to enable the reflective screen 1 to self-stand in a state where the shielding housing 6C is detached. Hence, the reflective screen 1 fixed to the strut member 7 can self-stand by the frame leg portions 17, 18, 19 of the frame member 16 even in a state where the shielding housing 6C is separated, and has excellent insatiability. Therefore, even in the case where the electric circuit portion 9 and the optical engine 5 inside the shielding housing 6C are broken, the shielding housing 6C is separated from the video projection device, and only the inside of the shielding housing 6C can be repaired or maintained.

The guide portions 33, 34, 35 are provided on the bottom surface portion of the shielding housing 6C, and the frame leg portions 17, 18, 19 are formed to be slidably insertable in the guide portions 33, 34, 35, respectively, and hence the shielding housing 6C and the frame member 16 can be connected while being easily positioned.

Figure 23:
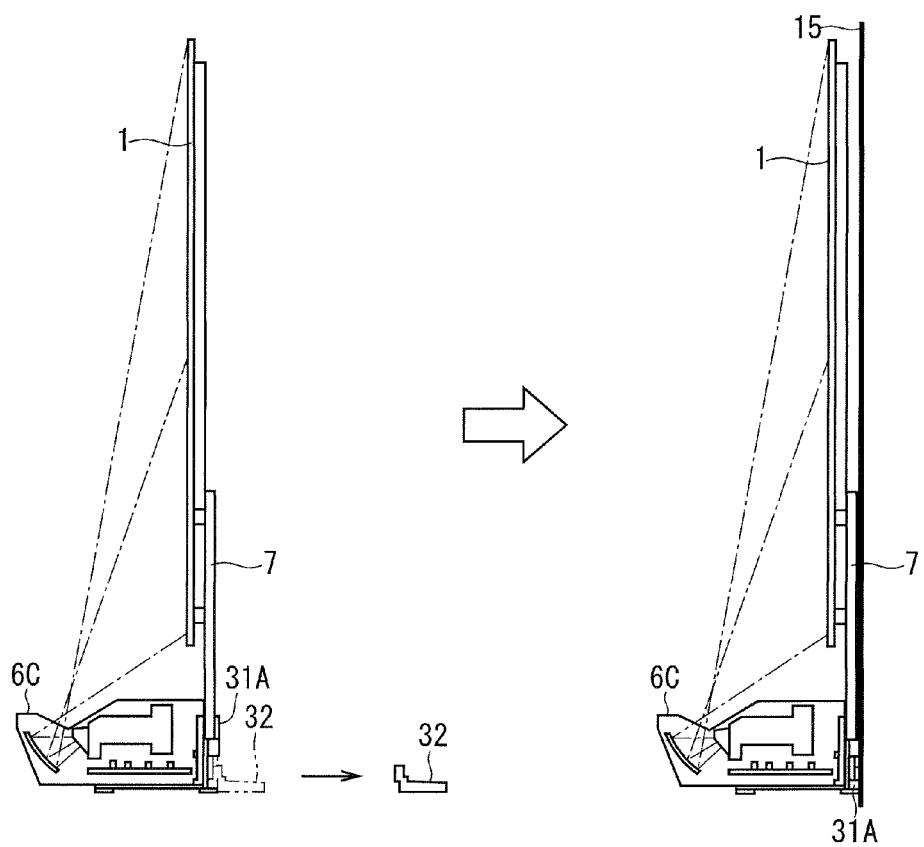
FIG. 23 is a side view showing a state where the video projection device is installed to make contact with a wall surface after a detachable portion is detached.

In the case of a video projection device mounted with a large-sized screen, there is a demand to install the large-sized screen displaying a video as close as possible to a wall. As shown in FIG. 23, a detachable portion 32 which is a third protrusion portion protruding rearward from the lower end of the rear surface portion of a back cover 31A, and detachably fixed to the back cover 31A with screws or the like is provided on the rear surface portion of the back cover 31A. When the video projection device is desired to be located as close as possible to the wall, the detachable portion 32 is detached, and the video projection device can be installed such that the rear surface portion of the back cover 31A is in contact with a wall surface 15.

The reflective screen 1 is arranged close to the wall, and therefore an image in which the reflective screen 1 is hung on the wall surface 15 is obtained, and the protruding amount to the inside of a room is reduced, thereby enabling further space saving. Generally, construction work for the wall, or installation of a holding member for wall hanging is required in order to hang the video projection device on the wall. However, according to the configuration of the present invention, it is possible to avoid such troublesome work, and arrange the reflective screen 1 close to the wall.

The detachable portion 32 has a function of the protrusion portion 31a shown in FIG. 20, namely, a function of preventing the video projection device from falling on the rear surface side. In the case where the detachable portion 32 is detached and the reflective screen 1 is installed close to the wall surface 15, as shown in FIG. 23, the strut member 7 comes close to the wall surface 15, and the rear surface of the back cover 31A is brought into contact with the wall surface 15. Consequently, the video projection device is prevented from falling on the rear surface side.

As described above, the video projection device further includes the back cover 31A which covers the rear surface side of the frame member 16, and the detachable portion 32 which protrudes from the rear surface portion of the back cover 31A in a self-standing manner and is detachable from the back cover 31A. Hence, the detachable portion 32 is detached from the back cover 31A when the video projection device is installed close to the wall, thereby making the rear surface portion of the strut member 7 come close to the wall surface 15, and enabling the video projection device to be installed in a state where the rear surface portion of the back cover 31A is in contact with the wall surface 15. Additionally, since the rear surface portion of the back cover 31A is in contact with the wall surface 15, the video projection device is prevented from falling on the rear surface.

The present invention can be made by freely combining the respective preferred embodiments, or appropriately modifying and omitting the respective preferred embodiments within the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A video projection device comprising:

an optical engine that projects video light;

a reflective optical element that reflects said video light projected by said optical engine with a reflective surface formed in a rotationally symmetrical shape centering on an optical axis;

a reflective screen on which said video light reflected by said reflective optical element is projected;

a shielding housing that houses said optical engine, said reflective optical element, and an electric circuit portion that electrically drives said optical engine; and a strut member that connects a rear surface portion of said shielding housing, and a rear surface portion of said reflective screen in a state where the rear surface portion of said shielding housing and the rear surface portion of said reflective screen are positioned, wherein the strut member has such a size as to be capable of supporting and connecting to only a central part of the rear surface portion of said reflective screen, and wherein the reflective screen is connected to the rear surface portion of said shielding housing through the strut member, and wherein in the rear surface portion of the reflective screen, a first plurality of screen reinforcing frames are fixed to the central part thereof with bonding members, and a second screen reinforcing frame is fixed between the first plurality of screen reinforcing frames with the bonding member.

2. The video projection device according to claim 1, wherein an upward open depression is formed on the rear surface portion of said shielding housing, and a lower end of said strut member and said depression are positioned.

3. The video projection device according to claim 1, further comprising a detachable portion provided so as to be detachable from said shielding housing, and having a first protrusion portion protruding from the rear surface portion of said shielding housing in a self-standing manner.

4. The video projection device according to claim 1, further comprising a frame member detachably connected between said strut member and said shielding housing, and having a second protrusion portion protruding in a self-standing manner in a state where said shielding housing is detached.

5. The video projection device according to claim 4, wherein
a guide portion is provided on a bottom surface portion of said shielding housing, and said second protrusion portion is formed so as to be slidably insertable in said guide portion.

6. The video projection device according to claim 4, further comprising:
a cover member that covers a rear surface side of said frame member; and
a third protrusion portion protruding from a rear surface portion of said cover member in a self-standing manner, and capable of detaching from said cover member.

7. The video projection device according to claim 1, further comprising
an adjustment portion capable of adjusting an angle of reflection of said video light on said reflective optical element with respect to said reflective screen, wherein
an opening portion from which said adjustment portion is exposed is formed on a front part of said shielding housing.

8. The video projection device according to claim 1, wherein
said strut member is formed by a transparent member.

9. The video projection device according to claim 1, wherein the width of the strut member is approximately the same as the width of the shielding housing.

10. The video projection device according to claim 1, wherein the width of the shielding housing is about ⅓ of the width of the reflective screen.

11. The video projection device according to claim 1, wherein in the rear surface portion of the reflective screen, said of first screen reinforcing frames is fixed to an upper end thereof with bonding members, said second screen reinforcing frame is fixed to a left end thereof with the bonding members, and a third screen reinforcing frame is fixed to a right end thereof with the bonding members.

* * * * *